Figure 1A:
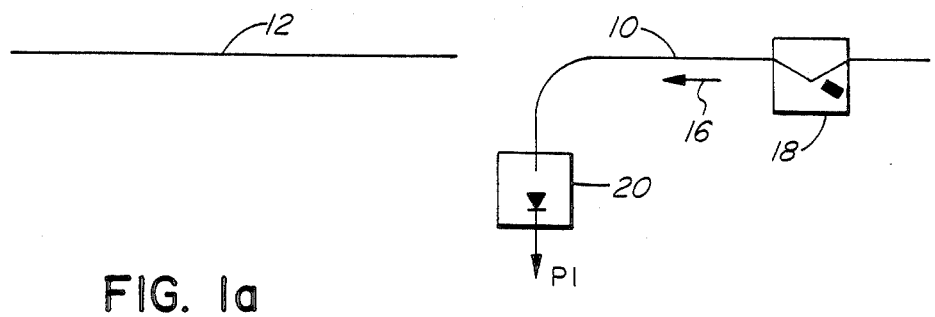

United States Patent [19]

So et al.

[11] Patent Number: 4,708,476

[45] Date of Patent: Nov. 24, 1987

[54] METHOD OF DETERMINING OPTICAL FIBER SPLICE LOSS

[75] Inventors: Vincent C. So; Richard P. Hughes; Paul J. Vella; Jason B. Lamont, all of Edmonton, Canada

[73] Assignee: Northern Telecom Limited, Montreal, Canada

[21] Appl. No.: 857,223

[22] Filed: Apr. 29, 1986

[51] Int. Cl.$^4$ ...................... G01N 21/84; G01N 21/59
[52] U.S. Cl. .................................................. 356/73.1
[58] Field of Search ........................................ 356/73.1

[56] References Cited

U.S. PATENT DOCUMENTS 4,360,268 11/1982 Zucker et al. ..................... 356/73.1

FOREIGN PATENT DOCUMENTS 2847488 5/1980 Fed. Rep. of Germany ..... 356/73.1

58-162831 9/1983 Japan ................................. 356/73.1

*Primary Examiner*—Vincent P. McGraw
*Attorney, Agent, or Firm*—R. John Haley

[57] ABSTRACT

In the formation of a splice between two optical fibers, the splice loss is determined by locally supplying an optical signal to each fiber, in a direction towards the end to be spliced, and measuring the signal level at the end of the fiber before making the splice, and using a symmetric detector to measure in one of the fibers the signal level passing in one direction towards the splice and in the opposite direction after passing through the splice, the splice loss being calculated from differences between the measurements. Alternative forms of symmetric detector, which is substantially equally responsive to optical signals in either direction in a fiber, are also described.

7 Claims, 8 Drawing Figures

METHOD OF DETERMINING OPTICAL FIBER SPLICE LOSS

This invention relates to a method of determining the loss of a splice between optical fibers, and to a detector for use in carrying out the method.

The increasing use of optical fibers in communications networks has resulted in a need for improved splices, having low loss, between fibers. Low loss splices between single mode optical fibers require precise alignment of the fiber cores; to date this requirement has been met most effectively by using optical fiber fusion splicers which use either local launch and detect or core imaging techniques. In the former technique light is locally launched into the fiber on one side of the splice and is locally detected in the fiber on the other side of the splice, the alignment being effected to achieve a maximum level of detected light. The latter technique achieves alignment by aligning visual images of the fiber cores.

In order to determine the acceptability of an optical fiber splice, it is desirable to provide an accurate measurement of the actual loss to which an optical signal is subjected in passing through the splice (referred to as the splice loss). Neither of the above techniques provides such a measurement.

Known methods of measuring splice loss are subject to various disadvantages such as destruction of the splice, inaccuracy, inconvenience, and the need to take an average of measurements in opposite directions of transmission after all splicing is complete.

Accordingly, an object of this invention is to provide an improved method of determining optical fiber splice loss.

According to this invention there is provided, in the formation of a splice between first and second optical fibers each including an end to be spliced, a method of determining loss at the splice comprising the steps of:

(1) supplying a first optical signal to the first fiber in a direction towards said end thereof and determining an optical signal level at said end;

(2) supplying a second optical signal to the second fiber in a direction towards said end thereof and determining an optical signal level at said end;

(3) determining, with a symmetric detector which is substantially equally responsive to optical signals in each direction, an optical signal level in the first fiber due to the first optical signal supplied thereto;

(4) after formation of a splice between said fibers at said ends thereof, determining with said symmetric detector an optical signal level in the first fiber due to the second optical signal supplied to the second fiber; and (5) determining the loss at the splice from the determined optical signal levels.

At least steps (1) and (2) recited above are preferably effected before formation of the splice, this facilitating the determination of the optical signal level at the end of each fiber. The optical signals are desirably supplied locally to the fibers using known local launch techniques. In this case desirably step (3) is effected after step (1) and before step (2), whereby a single local launch unit can be used to supply the optical signals to the first and second fibers in turn. In any event, the symmetric detector is preferably maintained in a fixed position with respect to the first fiber between steps (3) and (4), so that determination of the optical signal levels using the symmetric detector is not affected by movement of this detector.

Conveniently the loss at the splice is determined from the difference between the difference of the optical signal levels determined in steps 1 and 3 and the difference of the optical signal levels determined in steps 2 and 4. This loss may be conveniently determined using processing means already provided for use in performing splicing operations.

The invention also provides a symmetric detector, for use in a method as recited above, comprising: means for guiding and bending an optical fiber through a predetermined curved path, the curve being sufficiently tight for light carried by the fiber to be lost therefrom; and optical detection means responsive to light lost from the fiber at the curve, the optical detection means being arranged symmetrically with respect to the curved path of the fiber whereby it is substantially equally responsive to optical signals carried by the fiber in each direction.

Figure 2:
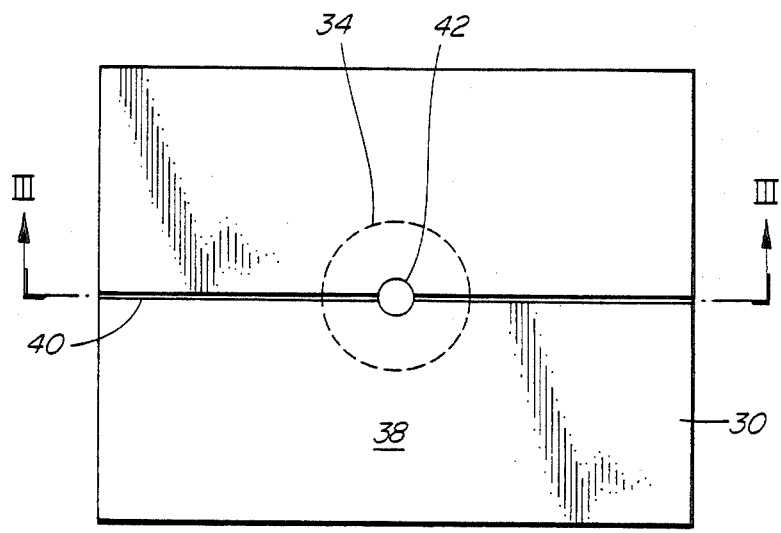
Figure 3:
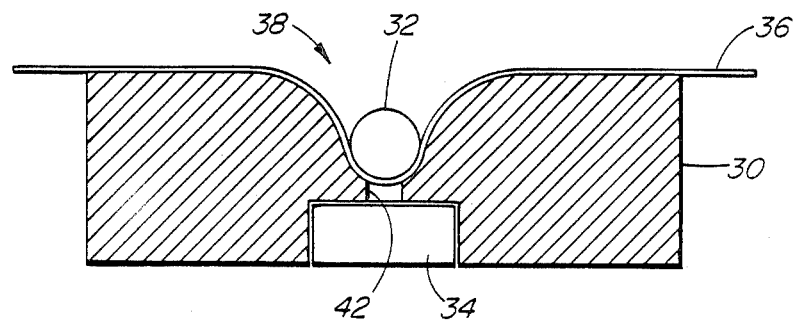
Figure 4:
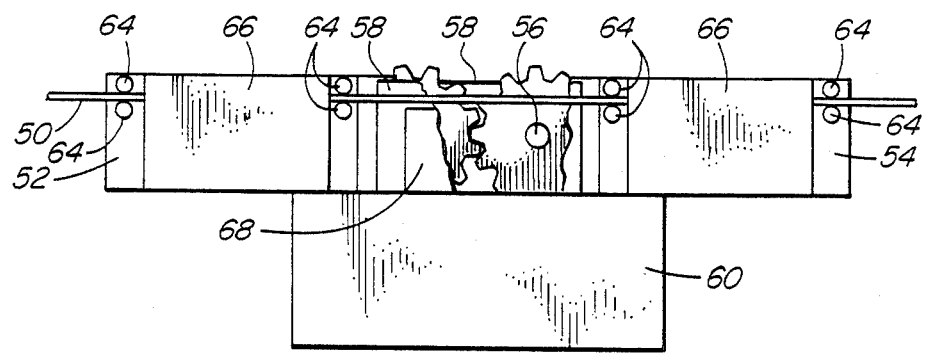
Figure 5:
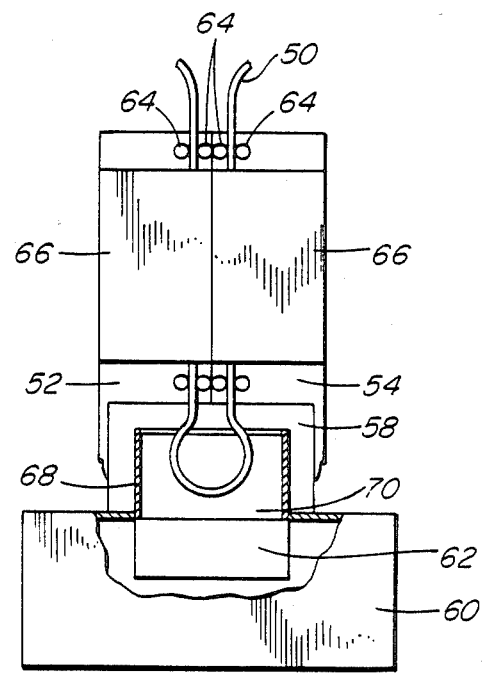

The invention will be further understood from the following description with reference to the accompanying drawings, in which:

FIGS. 1a to 1d schematically illustrate a sequence of steps performed in carrying out a method in accordance with the invention;

FIGS. 2 and 3 are respectively plan and cross-sectional schematic illustrations of a first form of detector which may be used in carrying out the method; and FIGS. 4 and 5 are partially cut-away schematic illustrations of a second form of detector in respective positions thereof.

Referring to FIGS. 1a to 1d, in which the same references are used throughout to denote corresponding parts, a sequence of four steps is illustrated for determining the actual splice loss of a splice between two optical fibers 10, 12. The splice 14 is actually made in known manner, for example using a fusion splicer with alignment of the optical fibers being achieved using known local launch and detect techniques, between the third and fourth steps, i.e. between the illustrations in FIGS. 1c and 1d.

In a first step, FIG. 1a, light is locally launched into one of the fibers 10, in a direction represented by an arrow 16 towards the end of the fiber to be spliced, by a local optical signal launch unit 18. A conventional form of optical signal detector, schematically illustrated as a photodiode detector 20, is used to detect the optical signal power, which is represented by a signal P1, which is launched into the optical fiber 10 and hence reaches the splice end of this fiber.

The local launch unit 18 is schematically illustrated in FIGS. 1a to 1d as comprising a block in which the optical fiber is bent and an optical signal is launched into the fiber at the bend from an appropriate light source. Such units are known for example from Canadian patent application No. 453,707 filed May 7, 1984 in the name of B.S. Kawasaki et al., assigned to Northern Telecom Limited and entitled "Fiber Optic Coupler".

Figure 1B:
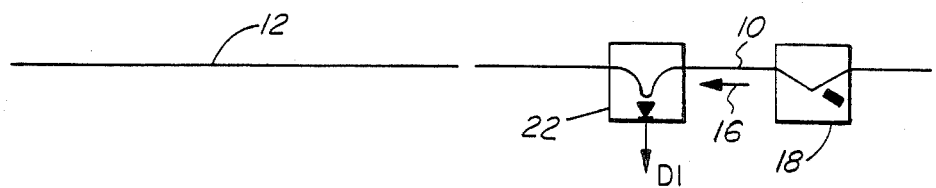

In a second step, FIG. 1b, the conventional detector 20 is removed and a measurement of the same optical signal launched into the fiber 10 by the unit 18 is made using a symmetric detector 22, to provide a signal D1. The symmetric detector 22 responds substantially equally to optical signals passing in either direction in the fiber 10. Examples of symmetric detectors are described below with reference to FIGS. 2 to 5.

Figure 1C:
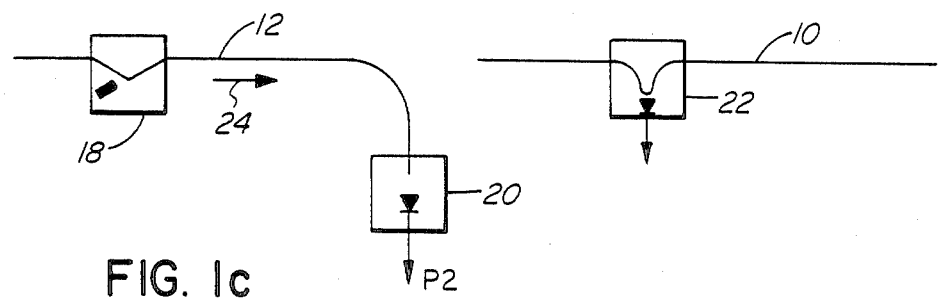

In a third step, FIG. 1c, the local launch unit 18 is removed from the fiber 10 and is applied to the other fiber 12 to launch light into this fiber in a direction represented by an arrow 24 towards the end of this fiber to be spliced, and the conventional detector 20 is used at the end of this fiber 12 to measure the optical signal power, represented by a signal P2, which is launched into this fiber. The symmetric detector 22 is not used in this step but remains in the same position on the fiber 10.

The detector 20 is then removed from the fiber 12, and the ends of the fibers 10 and 12 are spliced in generally known manner to form the splice 14. It is observed in this respect that as the local launch unit 18 and the symmetric detector 22 remain in their respective positions on the fibers 10 and 12 during the splicing operation, they may be used directly to aid core alignment of the fibers during the splicing operation.

Figure 1D:
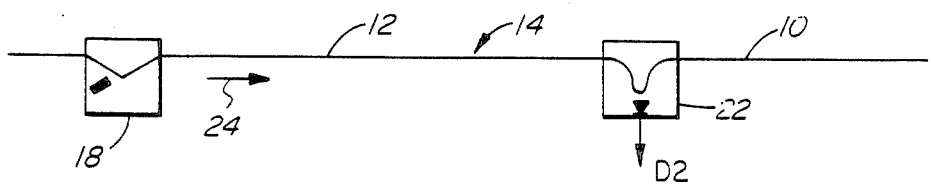

In a fourth step, FIG. 1d, after the splicing operation the symmetric detector 22 is used to provide a signal D2 representing the optical signal power reaching this detector from the launch unit 18 after passing through the splice 14, the units 18 and 22 having remained in their respective positions on the fibers 10 and 12. The units 18 and 22 are subsequently removed from the spliced fibers.

The actual optical signal power loss at the splice, referred to as the splice loss, is given by the equation:

Splice loss = (P2-D2) − (P1-D1) + C where P1, D1, P2, and D2 are the signal power measurements described above and C is a predetermined calibration factor for the particular symmetric detector 22 which is used. The calibration factor C is a function of the geometry of the symmetric detector 22 and is a measure of the difference in the response of this detector to optical signals of equal power in opposite directions through a fiber in the detector. The calibration factor C is therefore a constant for any particular detector and can readily be determined prior to use of the detector. In any event, for a symmetric detector which is substantially equally responsive to signals in the two opposite directions the calibration factor C is very small, and for a prefectly symmetric detector C=0. The above equation then reduces to:

Splice loss = (P2-D2) − (P1-D1).

From the foregoing description it should be appreciated that this method of measuring the splice loss can be easily incorporated directly into the splicing process, the signals P1, D1, P2, and D2 and the calibration factor C being handled by processing means in the splicing equipment to provide an immediate splice loss measurement for each splice which is made.

Referring now to FIGS. 2 and 3, a first form which the symmetric detector 22 may take comprises an optical fiber holder 30, a mandrel 32, and an optical signal detector 34. FIG. 2 is a plan view of the fiber holder 30 with the mandrel 32 removed, and FIG. 3 is a cross-sectional view, the cross-section being taken on the line III—III of FIG. 2, showing the holder 30 with the mandrel 32 and an optical fiber 36 in position therein.

An upper surface of the holder 30 is shaped to form a curved valley 38 as shown in FIG. 3, and includes a groove 40 which extends perpendicularly to the valley 38 for receiving and guiding the optical fiber 36 therein. The mandrel 32 is a round rod, with a diameter of for example 8 mm, and the bottom of the valley 38 has a corresponding size and shape whereby as shown in FIG. 3 the fiber 36 in the groove 40 is positioned and curved precisely by the complementary shapes of the mandrel 32 and valley 38. In this position, the fiber 36 passes over a hold 42 in the bottom of the valley 38, beneath which hole the detector 34 is positioned in a recess in the holder 30. The hole 42 and detector 34 are coaxial and symmetrically disposed with respect to the valley 38 and mandrel 32.

In use of this detector, the fiber 36 is placed in the groove 40 and the mandrel is then placed over the fiber 36 into the valley 38 to bend the fiber 36 in the manner shown in FIG. 3. As a result of the bend in the fiber, an optical signal carried by the fiber is lost to some extent at the bend and passes through the hole 42 to be detected by the detector 34. The hole 42 may have reflective walls to enhance light collection. Because the arrangement is symmetrical, the detector 34 is substantially equally responsive to light from optical signals passing in either direction in the fiber 36.

FIGS. 4 and 5 illustrate a second form of symmetric detector, each illustration including partially cut-away portions to provide a complete illustration of the detector. FIG. 4 illustrates the detector in an initial position in which an optical fiber 50 is inserted therein, and FIG. 5 illustrates the detector in an operating position for detection of optical signals carried in either direction by the fiber 50.

Referring to FIGS. 4 and 5, the detector comprises two arms 52, 54 each of which is pivotally mounted by a respective axle 56 to a U-shaped support 58 which is in turn supported on a base 60 which encloses an optical detector 62. Ends of the arms 52, 54 adjacent to the axles 56 are geared, and the gears of the arms mesh with one another, as shown in FIG. 4 so that the arms can move between the positions shown in FIGS. 4 and 5, the two arms always moving through equal angles.

Each arm 52, 54 carries guide posts 64 which in the position of the arms shown in FIG. 4 are aligned in pairs. The fiber 50 is placed between these guide posts 64 as shown in FIG. 4, and is held in place by tape pieces 66. Conveniently the arms 52, 54 are metal and the tape pieces 66 are magnetized plastic tape pieces which are attracted to the arms to hold the fiber 50 but are readily removable therefrom to remove the fiber from the detector. In the position shown in FIG. 4, the fiber 50 passes closely above the length of a longitudinal slot in a light shield 68 which is supported on the base 60 surrounding an opening 70 through which the detector 62 is exposed.

When the arms 52, 54 are moved to the position shown in FIG. 5, the guide posts 64 and tape pieces 66 prevent the fiber 50 from moving with respect to the arms. As a result, the part of the fiber 50 between the inner guide posts 64 closest to the axles 56 is deflected into a curve as shown in FIG. 5, and in the process largely enters the light shield 68 through the longitudinal slot. The shield 68, opening 70, and detector 62 are disposed symmetrically with respect to the arms 52, 54, so that optical signals passing in either direction along the fiber 50 produce equivalent responses in the detector 62. The response may be enhanced by making the inside of the light shield 68 highly reflective.

After making any desired measurements, the detector arms 52, 54 are returned to the position shown in FIG. 4, and the tape pieces 66 are removed to permit removal of the fiber 50.

Numerous modifications, variations, and adaptations may be made to the described embodiments without departing from the scope of the invention as defined in the claims.

What is claimed is:

1. In the formation of a splice between first and second optical fibers each including an end to be spliced, a method of determining loss at the splice comprising the steps of:

(1) supplying a first optical signal to the first fiber in a direction towards said end thereof and determining an optical signal level at said end;

(2) supplying a second optical signal to the second fiber in a direction towards said end thereof and determining an optical signal level at said end;

(3) determining, with a symmetric detector which is substantially equally responsive to optical signals in each direction, an optical signal level in the first fiber due to the first optical signal supplied thereto;

(4) after formation of a splice between said fibers at said ends thereof, determining with said symmetric detector an optical signal level in the first fiber due to the second optical signal supplied to the second fiber; and (5) determining the loss at the splice from the determined optical signal levels.

2. A method as claimed in claim 1 wherein steps (1) and (2) are effected before formation of the splice.

3. A method as claimed in claim 2 wherein step (3) is effected before formation of the splice.

4. A method as claimed in claim 2 wherein step (3) is effected before step (2).

5. A method as claimed in claim 1 wherein the symmetric detector is maintained in a fixed position with respect to the first fiber between steps (3) and (4).

6. A method as claimed in claim 1 wherein said optical signals are supplied locally to the fibers.

7. A method as claimed in claim 1 wherein the loss at the splice is determined from the difference between the difference of the optical signal levels determined in steps (1) and (3) and the difference of the optical signal levels determined in steps (2) and (4).

* * * * *